(12) United States Patent
Sun

(10) Patent No.: US 12,744,956 B2
(45) Date of Patent: Sep. 22, 2026

(54) DISPLAY DEVICE

(71) Applicant: HISENSE VISUAL TECHNOLOGY CO., LTD., Qingdao (CN)

(72) Inventor: Qiwei Sun, Qingdao (CN)

(73) Assignee: HISENSE VISUAL TECHNOLOGY CO., LTD., Qingdao (CN)

( * ) Notice: Subject to any disclaimer, the term of this patent is extended or adjusted under 35 U.S.C. 154(b) by 119 days.

(21) Appl. No.: 18/694,333

(22) PCT Filed: Jun. 23, 2022

(86) PCT No.: PCT/CN2022/100867

§ 371 (c)(1),
(2) Date: Mar. 21, 2024

(87) PCT Pub. No.: WO2023/000914

PCT Pub. Date: Jan. 26, 2023

(65) Prior Publication Data

US 2024/0406483 A1 Dec. 5, 2024

(30) Foreign Application Priority Data

Jul. 21, 2021 (CN) ......................... 202110823591.2
Jul. 29, 2021 (CN) ......................... 202110863945.6

(51) Int. Cl.
*H04N 21/422* (2011.01)
*H04N 21/485* (2011.01)
*H04N 21/488* (2011.01)

(52) U.S. Cl.
CPC ... *H04N 21/4221* (2013.01); *H04N 21/42204* (2013.01); *H04N 21/485* (2013.01); *H04N 21/4882* (2013.01)

(58) Field of Classification Search
CPC ............. H04N 21/4221; H04N 21/485; H04N 21/4882; H04N 21/42204
See application file for complete search history.

(56) References Cited

U.S. PATENT DOCUMENTS 10,856,136 B1 * 12/2020 Espy .................... H04B 17/318
2014/0045430 A1 * 2/2014 Kim .................. H04M 1/72412
455/566

(Continued)

FOREIGN PATENT DOCUMENTS

CN 101835279 A 9/2010
CN 102420641 A 4/2012

(Continued)

OTHER PUBLICATIONS

The World Intellectual Property Organization (WIPO) International Search Report for PCT/CN2022/100867 Sep. 21, 2022 6 Pages (including translation).

(Continued)

*Primary Examiner* — Pinkal R Chokshi
(74) *Attorney, Agent, or Firm* — ANOVA LAW GROUP, PLLC

(57) ABSTRACT

Provided in the present application is a display device. When a user needs to set a certain function key of a control apparatus, the user can enter a page display command into a display device, so as to control the display device to display a key editing page. After the user selects, on the key editing page, a target key option corresponding to a target function key, the display device can display a configuration page corresponding to the target key option.

20 Claims, 14 Drawing Sheets

(56) References Cited

U.S. PATENT DOCUMENTS

| | | | | |
|---|---|---|---|---|
| 2014/0195975 | A1 | 7/2014 | Kyoun | |
| 2017/0127114 | A1 * | 5/2017 | Lee | H04N 21/44224 |
| 2017/0180777 | A1 * | 6/2017 | Phang | H04N 21/4622 |
| 2017/0249018 | A1 * | 8/2017 | Huang | G06F 3/0238 |
| 2018/0213478 | A1 * | 7/2018 | Baron | H04L 69/14 |
| 2019/0058913 | A1 * | 2/2019 | Park | G06F 3/038 |
| 2020/0082819 | A1 * | 3/2020 | Kim | H04M 1/72412 |
| 2020/0285319 | A1 * | 9/2020 | Sirpal | H04N 21/4316 |
| 2020/0359487 | A1 * | 11/2020 | Tolen | H05B 45/20 |
| 2020/0374954 | A1 * | 11/2020 | Chen | H04W 12/50 |
| 2021/0251028 | A1 * | 8/2021 | Song | H04Q 9/04 |
| 2023/0018885 | A1 * | 1/2023 | Kwon | G08C 23/04 |
| 2024/0045645 | A1 * | 2/2024 | Hu | G06F 3/165 |
| 2024/0118854 | A1 * | 4/2024 | Xie | H04W 4/08 |

FOREIGN PATENT DOCUMENTS

| | | | |
|---|---|---|---|
| CN | 103578246 | A | 2/2014 |
| CN | 104506910 | A | 4/2015 |
| CN | 205670771 | U | 11/2016 |
| CN | 106773769 | A | 5/2017 |
| CN | 108171951 | A | 6/2018 |
| CN | 110662097 | A | 1/2020 |
| CN | 111343495 | A | 1/2020 |
| CN | 112054946 | A | 12/2020 |
| CN | 112672195 | A | 4/2021 |
| CN | 112947888 | A | 6/2021 |
| CN | 113490024 | A | 10/2021 |
| CN | 113821184 | A | 12/2021 |
| WO | 2021116152 | A1 | 6/2021 |

OTHER PUBLICATIONS

China National Intellectual Property Administration (CNIPA) Office Action 2 for Application No. 202110863945.6 Sep. 14, 2024 20 Pages (including translation).

* cited by examiner

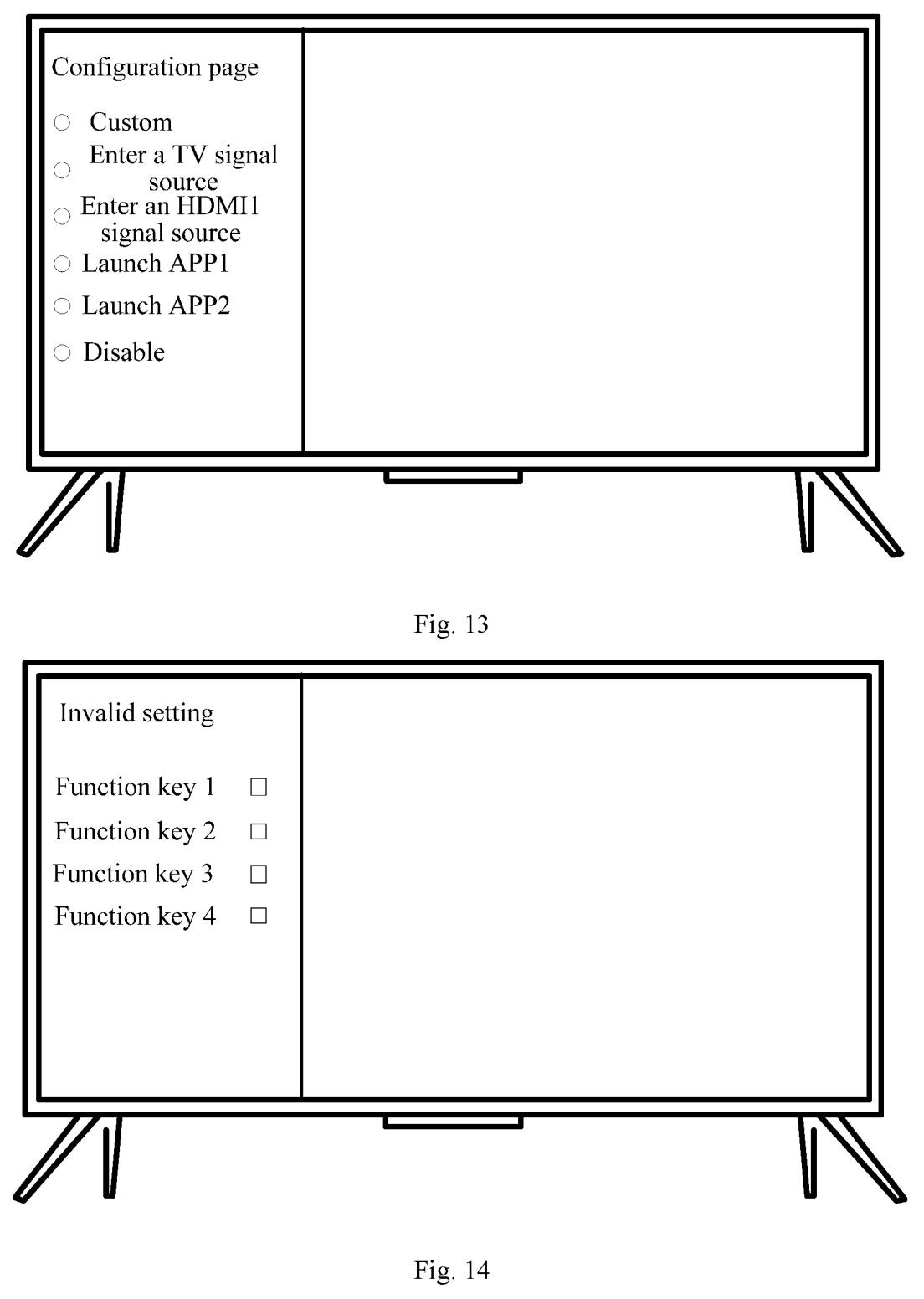

Configuration page

Custom

Enter a TV signal source

Enter an HDMI1 signal source

Launch APP1

Launch APP2

Disable

Fig. 13

Invalid setting

Function key 1

Function key 2

Function key 3

Function key 4

Fig. 14

DISPLAY DEVICE

CROSS REFERENCE TO RELATED APPLICATIONS

The disclosure is a national phase entry under 35 U.S.C § 371 of International Application No. PCT/CN2022/100867, filed Jun. 23, 2022, which claims the priority to Chinese Patent Application No. 202110863945.6, filed on Jul. 29, 2021, and entitled "METHOD FOR PAIRING CONTROL DEVICE AND DISPLAY APPARATUS, AND DISPLAY APPARATUS"; and Chinese Patent Application No. 202110823591.2, filed on Jul. 21, 2021, and entitled "METHOD FOR SETTING KEY OF CONTROL DEVICE, AND DISPLAY APPARATUS", which are incorporated in their entireties herein by reference.

TECHNICAL FIELD

The disclosure relates to the field of a display technology, and in particular to a display apparatus.

BACKGROUND

Functions of a display apparatus are increasing as the display apparatus develops and the research on the display apparatus deepens. As a tool for a user to rapidly operate the display apparatus, a physical control device such as a remote controller needs to be better adapted to the display apparatus, so as to help the user use the display apparatus more conveniently.

SUMMARY

The disclosure provides a display apparatus. The display apparatus includes: a display; a user input interface configured to receive a command input from a user; a remote controller including a plurality of keys; and a controller connected with the display and the user input interface and configured to: control the display to display a key editing page in response to a page display command input from the user to the display apparatus, where the key editing page is configured to display a key option corresponding to each editable function key on a control device; control the display to display a configuration page corresponding to a target key option in response to a first selection command for selecting the target key option on the key editing page, from the user, where the configuration page is configured to display a function option that is associated with a target function key in the display apparatus; and associate a target function corresponding to a target function option with the target function key in response to a second selection command for selecting the target function option on the configuration page from the user, to complete setting of the function key on the control device.

BRIEF DESCRIPTION OF FIGURES

The drawings in the embodiments will be briefly described below.

FIG. 13 is a schematic diagram of a configuration page having a disable option according to some embodiments.

FIG. 14 is a schematic diagram of an invalid setting page according to some embodiments.

DETAILED DESCRIPTION

In order to make the objectives and embodiments of the disclosure clearer, the exemplary embodiments of the disclosure will be clearly and completely described below in combination with the drawings in the exemplary embodiments of the disclosure. Obviously, the described exemplary embodiments are merely some embodiments rather than all embodiments of the disclosure.

It should be noted that the brief description of the terms in the disclosure is only for convenience of understanding the embodiments described below, and is not intended to limit the embodiments of the disclosure. Unless otherwise noted, these terms should be understood in accordance with ordinary and plain meanings of the terms.

Figure 1:
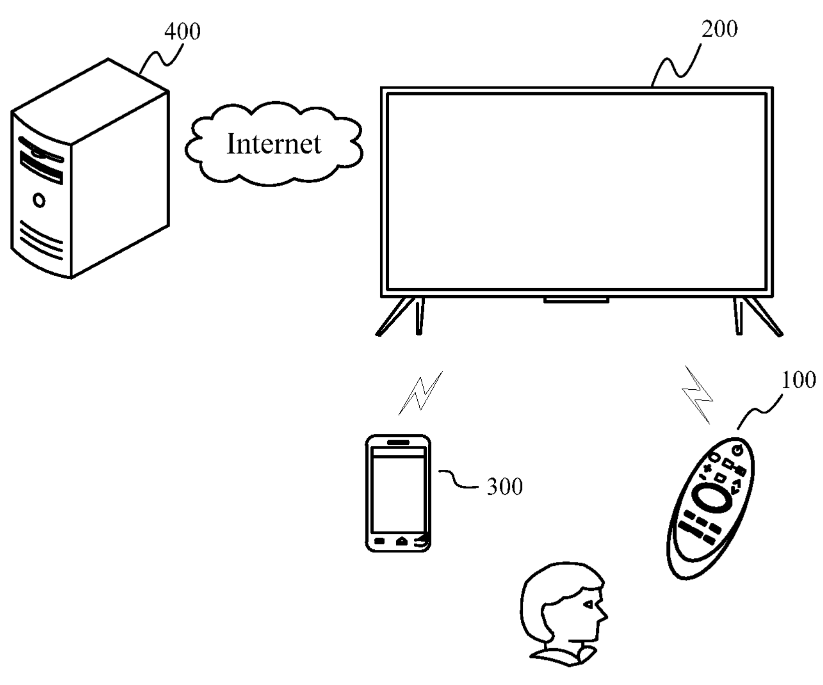
FIG. 1 is a schematic diagram of a usage scenario of a display apparatus according to some embodiments.

FIG. 1 is a schematic diagram of a usage scenario of a display apparatus according to some embodiments. As shown in FIG. 1, the display apparatus 200 is further in data communication with a server 400. A user may operate the display apparatus 200 via a smart device 300 or a control device 100.

In some embodiments, the control device 100 may be a remote controller. Communication between the remote controller and the display apparatus includes infrared protocol communication or Bluetooth protocol communication, as well as at least one of other short distance communication modes. The display apparatus 200 is controlled in a wireless or wired manner.

In some examples, the smart device 300 may include any one of a mobile terminal, a tablet computer, a computer, a notebook computer, an augmented reality (AR)/virtual reality (VR) device, etc.

In some embodiments, the display apparatus 200 may be also controlled through the smart device 300. For example, the display apparatus 200 is controlled through an application running on the smart device.

In some embodiments, the smart device 300 may be used to be in data communication with a display apparatus.

In some embodiments, the display apparatus 200 may be further controlled via a manner apart from the control device 100 and the smart device 300. For example, a module for obtaining a voice command configured inside the display apparatus 200 directly receives the voice command from a user, or a voice control device arranged outside the display apparatus 200 receives a voice command from a user.

In some embodiments, the display apparatus 200 is further in data communication with the server 400. The display apparatus 200 may be allowed to be in communication connection through a local area network (LAN), a wireless local area network (WLAN), and other networks. The server 400 may provide various contents and interactions for the display apparatus 200.

Figure 2:
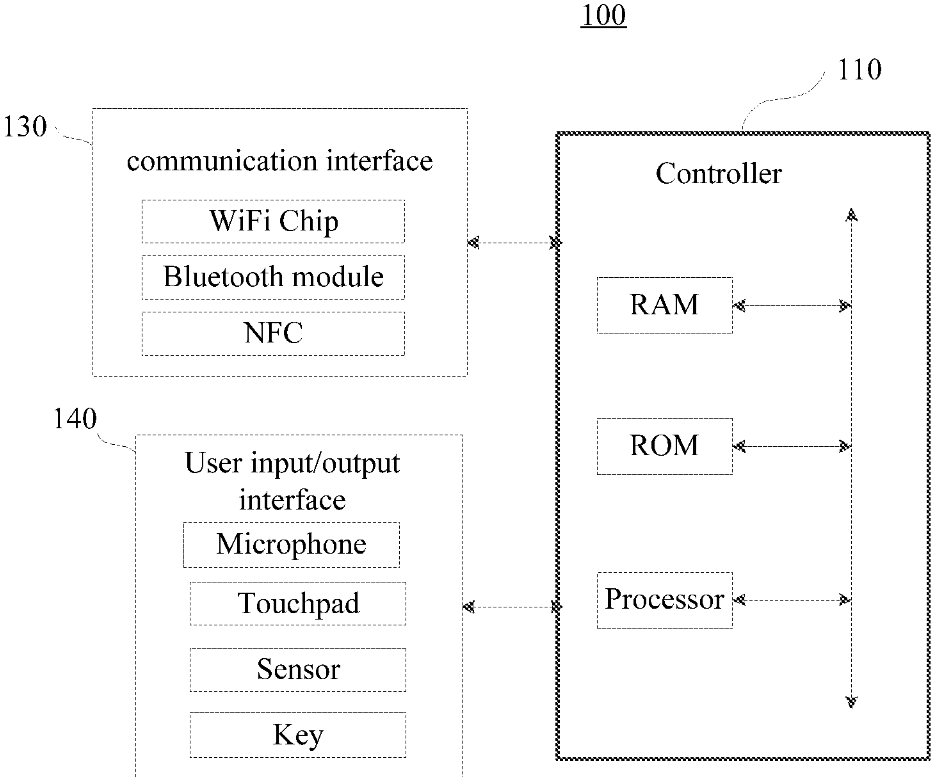
FIG. 2 is a block diagram of a hardware configuration of a control device 100 according to some embodiments.

FIG. 2 is a block diagram of hardware configuration of a control device 100 according to some embodiments. As shown in FIG. 2, the control device 100 includes a controller 110, a communication interface 130, a user input/output interface 140, a memory, and a power supply. The control device 100 may receive an operation command input from a user, and converts the operation command into an instruction that may be recognized and responded by a display apparatus 200, so as to serve as interactive interface between the user and the display apparatus 200.

In some embodiments, the communication interface 130 is configured to be in communication with outside, and includes at least one of a wireless fidelity (WIFI) chip, a Bluetooth module, a near field communication (NFC) module or an alternative module.

In some embodiments, the user input/output interface 140 includes at least one of a microphone, a touch pad, a sensor, a key or an alternative module.

Figure 3:
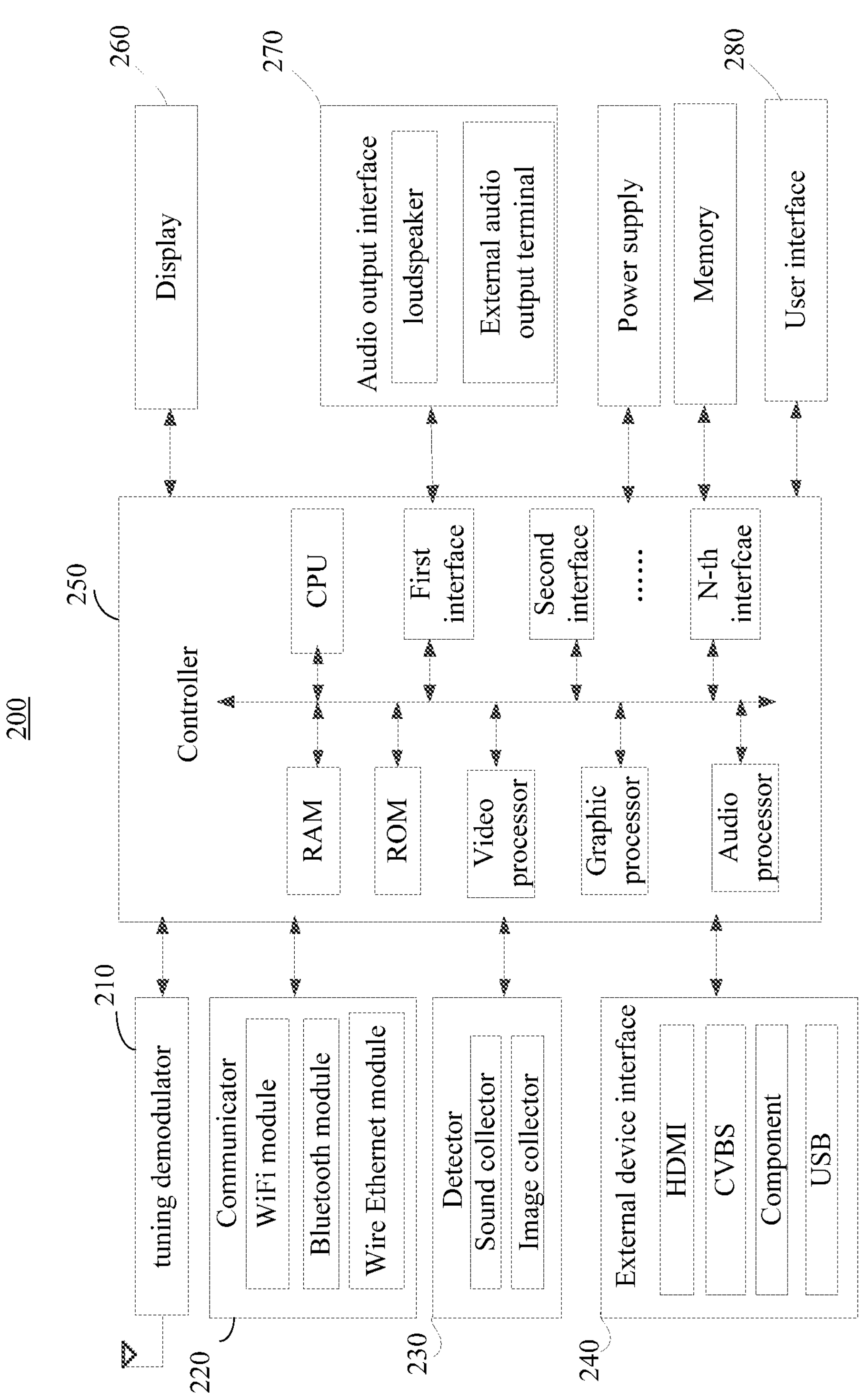
FIG. 3 is a block diagram of a hardware configuration of a display apparatus 200 according to some embodiments.

FIG. 3 is a block diagram of hardware configuration of a display apparatus 200 according to some embodiments.

In some embodiments, the display apparatus 200 includes at least one of a tuning demodulator 210, a communicator 220, a detector 230, an external device interface 240, a controller 250, a display 260, an audio output interface 270, a memory, a power supply and a user interface.

In some embodiments, the controller includes a central processing unit, a video processing unit, an audio processing unit, a graphics processing unit, a random access memory (RAM), a read only memory (ROM), and a first interface to an n-th interface for input/output.

In some embodiments, the display 260 includes a panel component configured to present an image and a drive component configured to drive image display, a component configured to receive an image signal output from a controller and display a video content, an image content and a menu operation interface, a user interface (UI) for user operation, etc.

In some embodiments, the display 260 may be at least one of a liquid crystal display, an organic light-emitting diode (OLED) display and a projection display, and may be further a projection apparatus and a projection screen.

In some embodiments, the tuning demodulator 210 receives a broadcast television signal in a wired or wireless mode, and demodulates audio and video signals, such as an electronic program guide (EPG) data signal, from a plurality of wireless or wired broadcast television signals.

In some embodiments, the communicator 220 is a component configured to communicate with an external device or a server according to various communication protocol types. For example, the communicator may include at least one of a WIFI module, a Bluetooth module, a wired Ethernet module, other network communication protocol chips or near field communication protocol chips, and an infrared receiver. The display apparatus 200 may establish transmission and reception of a control signal and a data signal with the control device 100 or the server 400 through the communicator 220.

In some embodiments, the detector 230 is configured to collect a signal from an external environment or a signal for interacting with an outside. For example, the detector 230 includes a light receiver, and a sensor configured to collect ambient light intensity; or, the detector 230 includes an image collector, such as a camera, which may be configured to collect an external environment scenario, user attributes or user interaction gestures; or, the detector 230 includes a sound collector, such as a microphone, which is configured to receive external sound.

In some embodiments, an external device interface 240 may include, but not limited to, any one or more of the following interfaces: a high definition multimedia interface (HDMI), an analog or data high-definition component input interface (component), a composite video broadcast signal (CVBS), a universal serial bus (USB) port, a red, green and blue (RGB) port, etc.

In some embodiments, the controller 250 and the tuning demodulator 210 may be located in different individual devices. That is, the tuning demodulator 210 may also be in an external device of a main device in which the controller 250 is located, such as an external set-top box.

In some embodiments, the controller 250 controls the display apparatus to work and responds to operations from a user via various software programs stored in a memory. The controller 250 controls an overall operation of the display apparatus 200. In some embodiments, the user input interface 280 is an interface that may be configured to receive a control input (such as a physical key on a display apparatus body, or others).

Figure 4:
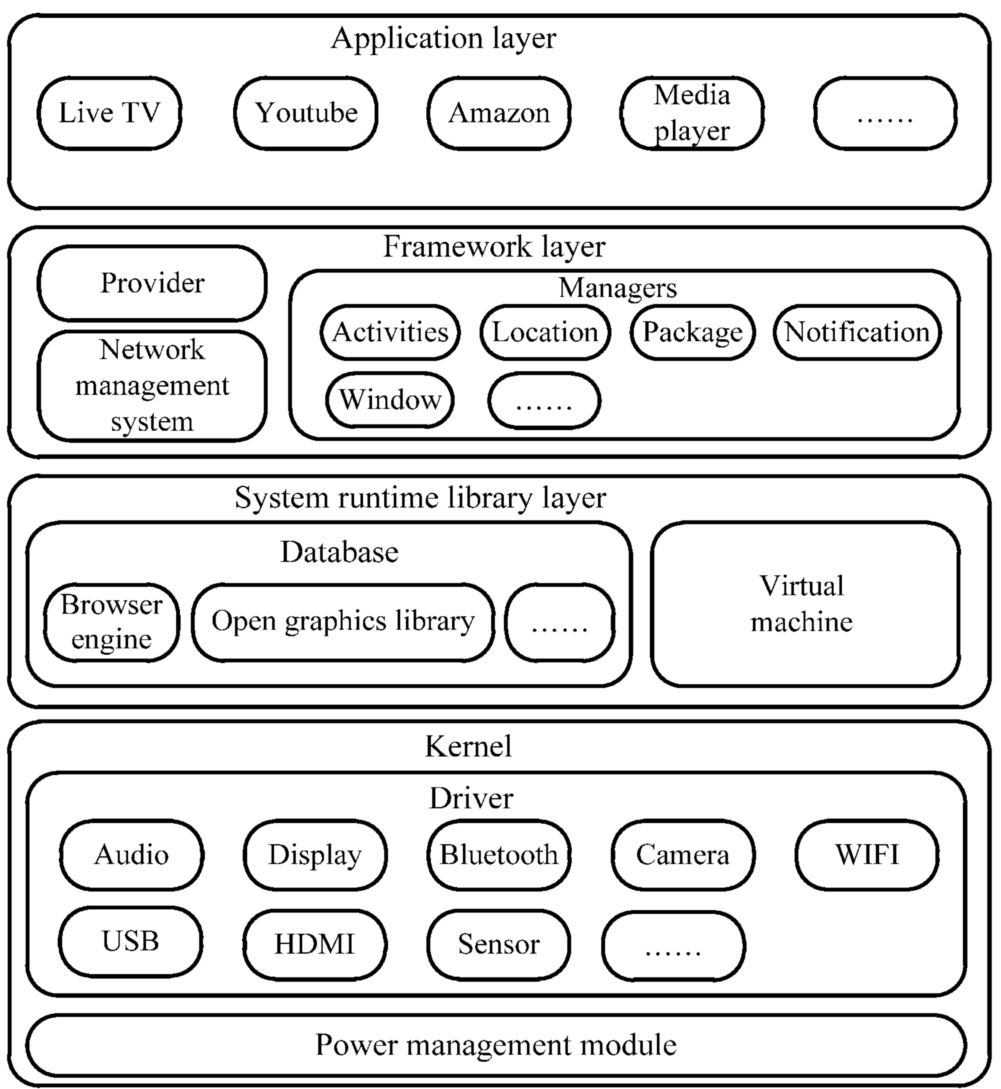
FIG. 4 is a diagram of a software configuration of a display apparatus 200 according to some embodiments.

With reference to FIG. 4, in some embodiments, a system is divided into four layers, from top to bottom, i.e. an application layer, an application framework layer (referred to as "framework layer"), an Android runtime and system library layer (referred to as "system runtime library layer"), and a kernel layer.

Functions of a display apparatus 200 are increasing with development and deep research for the display apparatus 200. Serving as a tool for a user to rapidly operate the display apparatus 200, a physical control device 100 such as a remote controller needs to be better adapted to the display apparatus 200, so as to help the user use the display apparatus 200 more conveniently.

On the basis of the demand of simplifying keys, the number of keys on the physical control device 100 such as the remote controller is significantly reduced. Only direction keys, a confirmation key, function keys having specific functions, etc., are often provided on the control device. With reference to a schematic diagram of a control device 100 shown in FIG. 5, a middle upper portion of the control device 100 is provided with top, bottom, left and right direction keys and a confirmation key among the direction keys. Moreover, an upper portion of the control device is further provided with a power key, and a lower portion of the control device is further provided with a home key, a back key, a menu key, and volume keys. These keys are keys having specific functions, and may only achieve corresponding functions.

Figure 5:
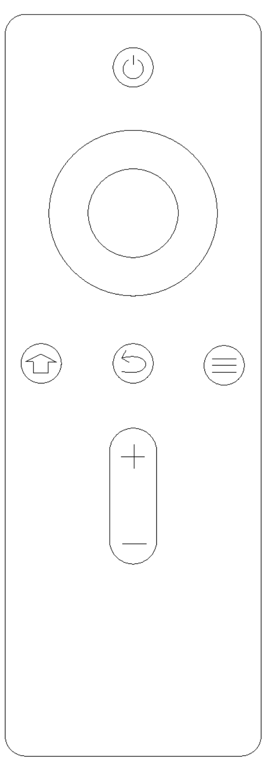
FIG. 5 is a schematic diagram of a control device 100 according to some embodiments.

However, the keys on the control device 100 after the keys are simplified as shown in FIG. 5 may not achieve all functions of the display apparatus 200. If the user wants to find a target function on the display apparatus 200, the user usually needs to frequently operate the keys on the control device 100. For example, the user needs to frequently press different direction keys and the confirmation key. Frequent operations may affect use of the display apparatus 200 for the user. Thus, in view of the increasingly more functions, the control device 100 such as the remote controller is not able to satisfy the demands for quick operations.

In order to solve the problem that the keys on the control device 100 cannot satisfy the increasingly more functions of the display apparatus 200, embodiments of the disclosure provides a display apparatus 200. The display apparatus 200 may be connected with the control device 100. The user sends a command to the display apparatus 200 by pressing a key on the control device 100, so as to control the display apparatus 200 to achieve a corresponding function and display a corresponding content.

Figure 6:
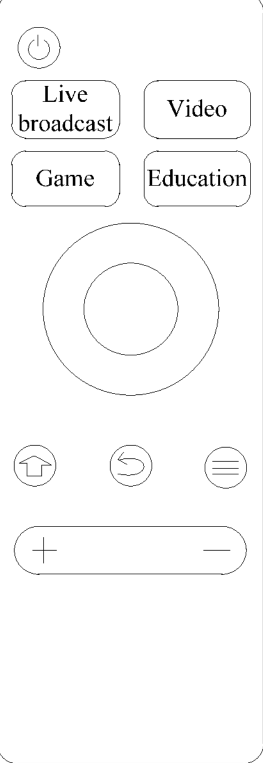
FIG. 6 is another schematic diagram of a control device 100 according to some embodiments.

Moreover, the control device 100 is further provided with some editable function keys apart from the keys with specific functions, for example, some keys having different colors are provided on the control device 100, or some function keys are preset on the control device 100. With reference to FIG. 6, another schematic diagram of a control device 100 according to some embodiments is shown. The control device 100 is further provided with some editable function keys such as "live broadcast", "video", "game" and "education".

Different associated functions may be set for the editable function keys in the display apparatus 200 according to the embodiments of the disclosure. When the functions are associated with the editable function keys, the display apparatus 200 may provide a key editing page for the user, and may display a key option for each function key on the key editing page.

Figure 7:
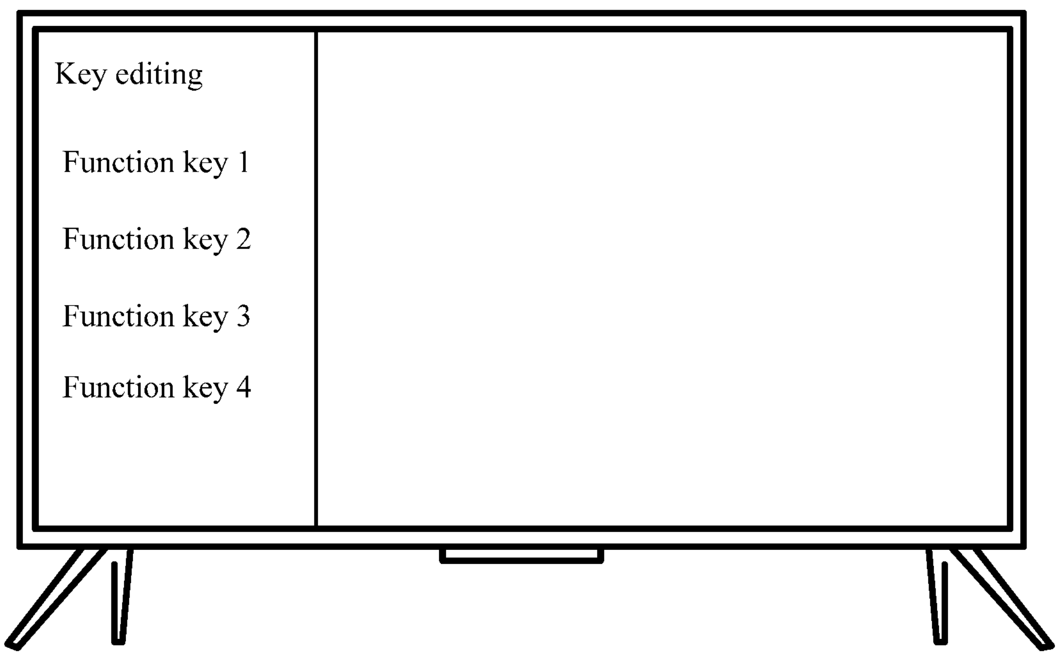
FIG. 7 is a schematic diagram of a key editing page according to some embodiments.

With reference to FIG. 7, a schematic diagram of a key editing page according to some embodiments is shown. If a control device 100 has four editable function keys, four key options for the four function keys, i.e. a function key 1, a function key 2, a function key 3 and a function key 4, may be displayed on the key editing page.

The user may select a corresponding key option as a target key option after viewing the key editing page, thereby further controlling the display apparatus 200 to display a configuration page corresponding to the target key option. For example, if the user wants to set an associated function of the second editable function key on the control device 100, the user may select the function key 2 on the key editing page, and further control the display apparatus 200 to display a configuration page corresponding to the function key 2.

Figure 8:
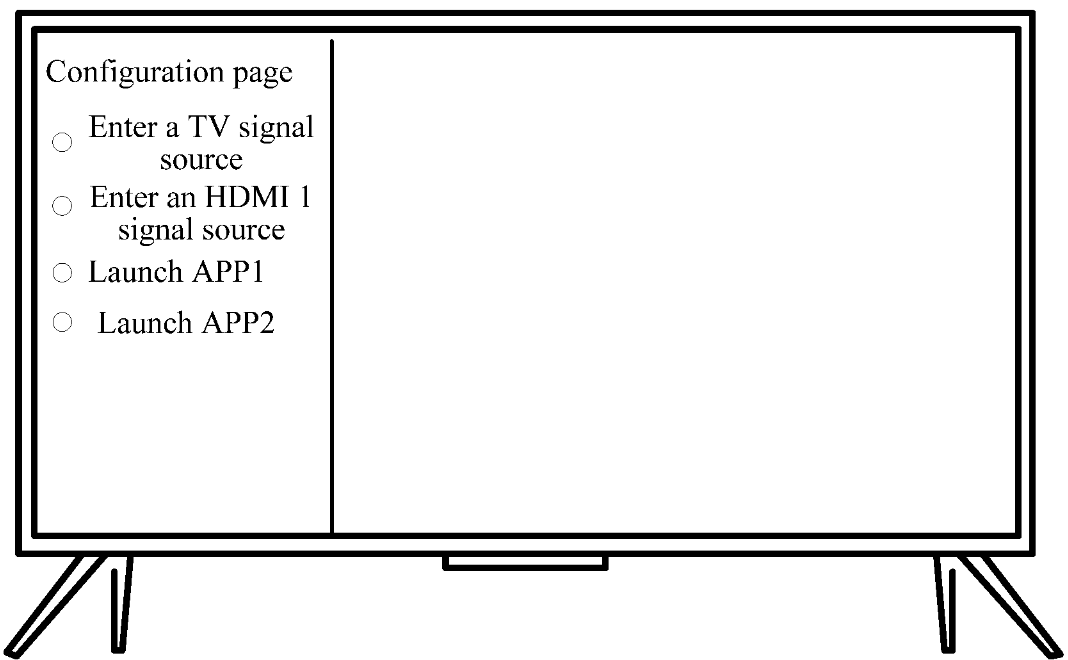
FIG. 8 is a first schematic diagram of a configuration page according to some embodiments.

The configuration page usually displays all function options on the display apparatus 200 that may be associated with the function keys. Each function option corresponds to a function, for example, switch to a television (TV) signal source, open an application (APP), etc. With reference to FIG. 8, a first schematic diagram of a configuration page according to some embodiments is shown. The configuration page is a configuration page corresponding to a function key 2, and includes some options of operation contents, for example, enter a TV signal source, enter an HDMI1 signal source, launch APP1, and launch APP2.

The user may select a target function option from several function options after viewing the configuration page, thereby controlling a display apparatus 200 to associate a target function corresponding to the target function option with a target function key. For example, if the target function option selected by the user on the configuration page corresponding to the function key 2 is "enter a TV signal source", the display apparatus 200 associates a function of "enter a TV signal source" with the function key 2. In this case, setting of the function key 2 on the control device 100 has been completed.

After association setting between the target function and the target function key is completed, the display apparatus 200 may directly achieve the function associated with the function key when the user presses the function key whose function has been set anew, which is implemented by executing the operation(s) included in the function. For example, the user has set the target function of the function key 2 as "enter a TV signal source" in the above embodiment. When the user presses the function key 2, the display apparatus 200 may directly execute an operation of switching signal sources, switches to a TV signal source, and displays the content from this TV signal source.

In the above embodiment, the user may input a page display command to the display apparatus 200 by pressing a key on the control device 100 such as a remote controller. For example, a different page option is selected by pressing a direction key, and then a page display command for selecting the page option is input to the display apparatus 200 by pressing a confirmation key. Moreover, the user may input a page display command to the display apparatus 200 by inputting a voice content to the display apparatus 200 having a voice recognition module. For example, the input voice content may be "open a key editing page".

In the embodiments of the disclosure, different functions to be selected may be set for the editable function keys on the control device 100. The user may set the functions corresponding to the function keys according to requirements of the user. For example, the user may set commonly used functions. Thus, when the user needs the display apparatus 200 to execute a target function, the user only needs to press a corresponding function key once, instead of pressing the direction keys and the confirmation key on the control device 100 multiple times to gradually find the target function. Thus, operation steps are simplified, use experience of a user is ensured, and the function key may be adapted to more functions.

Figure 9:
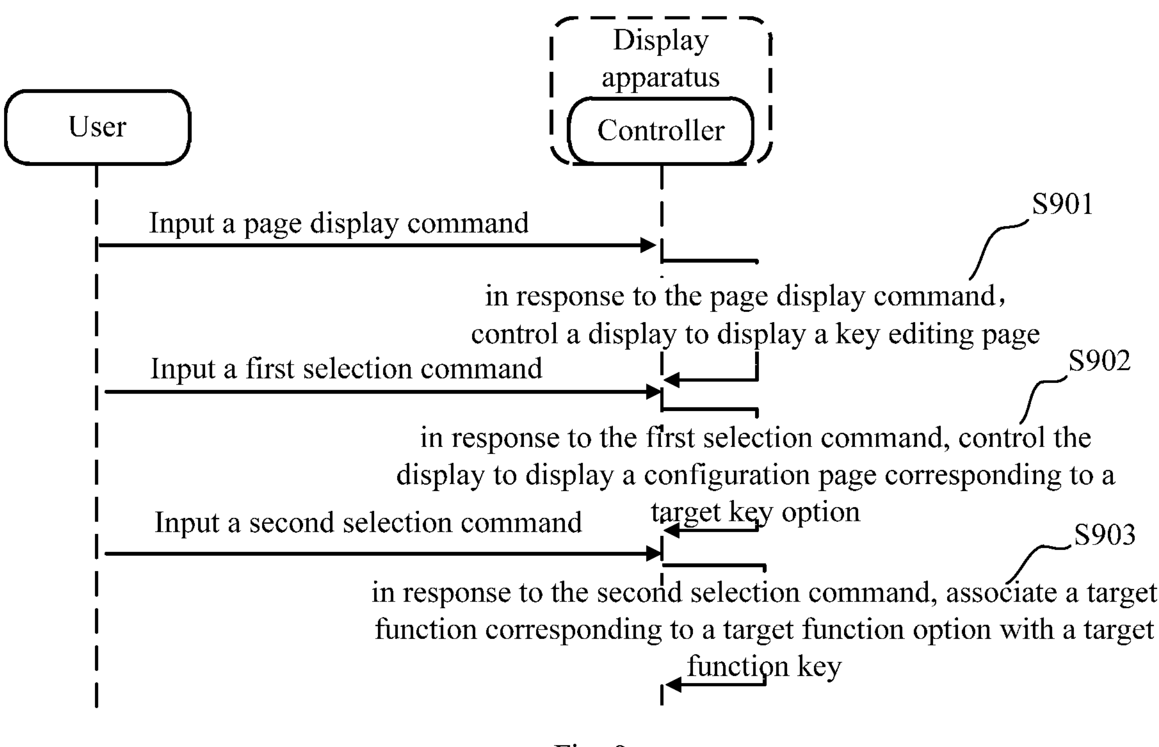
FIG. 9 is a flow chart of setting a function key on a display apparatus 200 according to some embodiments.

With reference to FIG. 9, a flow chart for setting a function key on a display apparatus 200 according to some embodiments is shown. In the above process of setting the function key on the display apparatus 200, a controller 250 of the display apparatus 200 may be configured to:

S901, in response to a page display command input from a user to a display apparatus 200, control a display 260 to display a key editing page. A user selects the target key option on the key editing page, and further inputs a first selection command to the display apparatus 200;

S902, in response to a first selection command, control the display 260 to display a configuration page corresponding to a target key option. The user selects a target function option on the configuration page, and further inputs a second selection command to the display apparatus 200; and S903, in response to a second selection command, associate a target function corresponding to a target function option with the target function key, to complete setting of the target function key on the control device 100.

Generally, the target function options having the specific operation contents in the above embodiments are all preconfigured in the display apparatus 200. Basic elements which are able to realize the functions or operations all exist or are available in the display apparatus 200, for example, the TV signal source in "enter a TV signal source", the HDMI1 signal source in "enter an HDMI1 signal source", the APP1 in function "launch APP1", the APP2 function in "launch APP2", etc. The signal sources or APPs exist in the display apparatus 200 or can be controlled or run by the display apparatus 200. The function options corresponding to the functions are also operation options having specific operation contents. Thus, after the user selects such function options, the display apparatus 200 may associate the specific operation contents corresponding to the target function options with the target function keys, thereby completing setting of the function keys on the control device 100.

On this basis, in the process of setting the function key on the display apparatus 200, the controller 250 of the display apparatus 200 further needs to further determine the type of the target function option after the user selects the target function option. The controller 250 may associate the specific operation content corresponding to the operation option with the target function key under the condition that the target function option is the operation option described above.

In the display apparatus 200, an additional APP may further be added to the display apparatus 200 according to a download operation of the user apart from the signal sources and APPs which have been controlled or run in the display apparatus described above. Such an APP is not owned by the display apparatus 200, and the display apparatus 200 also does not determine whether such an APP may be downloaded. Thus, the display apparatus 200 may not preconfigure a specific operation content for such an APP, and may only display the name of the APP on a custom page after the APP is downloaded.

In the embodiments of the disclosure, in addition to function option(s) whose type is operation item, the configuration page further has a function option whose type is a custom option. When the user selects the custom option on the configuration page, the display apparatus 200 may display a custom page corresponding to the custom option.

Figure 10:
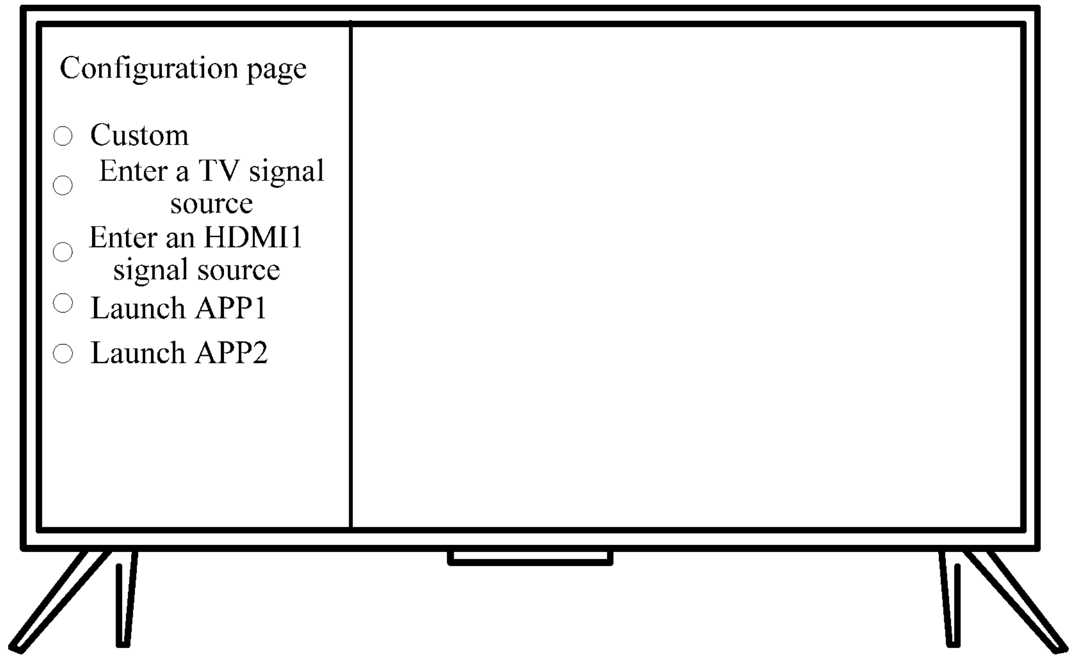
FIG. 10 is a second schematic diagram of a configuration page according to some embodiments.

With reference to FIG. 10, a second schematic diagram of a configuration page according to some embodiments is shown. The configuration page not only includes operation options like "enter a TV signal source", "enter an HDMI1 signal source", "launch APP1", "launch APP2", etc., and but also includes a "custom" option.

Figure 11:
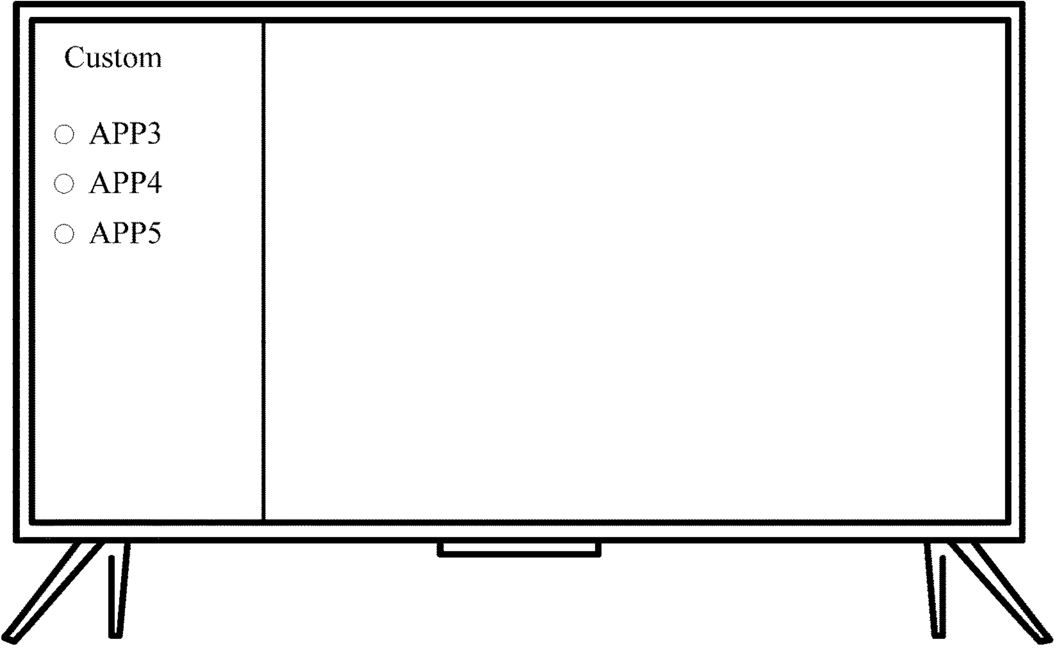
FIG. 11 is a schematic diagram of a custom page according to some embodiments.

With reference to FIG. 11, a schematic diagram of a custom page according to some embodiments is shown. If a user downloads applications such as APP3, APP4 and APP5 on a display apparatus 200, application options of the APP3, the APP4 and the APP5 are sequentially displayed on the custom page.

The display apparatus 200 may associate a target application corresponding to a target application option with a target function key after the user selects the target application option on the custom page, thereby completing setting of the function key on the control device 100. For example, the custom page corresponding to the function key 2 is shown in FIG. 11. If the user selects the application option APP3, the display apparatus 200 associates the APP3 with the function key 2. Thereafter, the user presses the function key 2 on the control device 100, and the display apparatus 200 directly launches the APP3.

Figure 12:
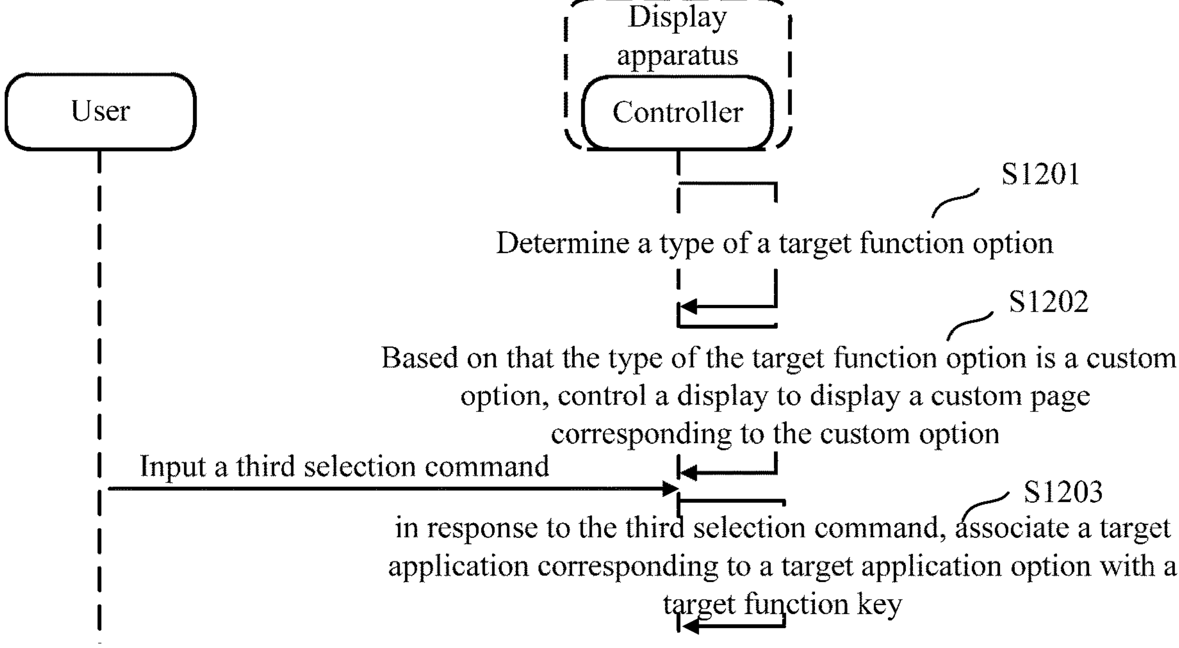
FIG. 12 is another flow chart of setting a function key on a display apparatus 200 according to some embodiments.

In the above process of associating a function key with an application, as shown in FIG. 12, the controller 250 of the display apparatus 200 may be configured to:

S1201, determine a type of a target function option;

S1202, based on that the type of the target function option is a custom option, control a display 260 to display a custom page corresponding to the custom option. The user selects the target application option on the custom page, i.e. inputs a third selection command to the display apparatus 200; and S1203, in response to a third selection command, associate a target application corresponding to a target application option with a target function key, to complete setting of a function key on the control device 100.

When the control device 100 may be placed at a side after the control device 100 is used by the user, the user may accidentally touch a key on the control device 100 when viewing a content of the display apparatus 200 normally. If the touched key is a preconfigured function key, the display apparatus 200 may immediately execute an operation corresponding to the function key or launch an APP corresponding to the function key, which may interrupt a content being viewed by the user and affect user experience.

In view of the above situation, in order to solve the problem of interruption of the display content caused by the accidental touching of the key by the user in some cases, the display apparatus 200 may further provide a disable function of the function key on the control device 100 for the user. In the embodiments of the disclosure, the disable function may also correspond to a function option on the configuration page, i.e. a disable option. When the user selects the disable option on the configuration page corresponding to the target function key, the display apparatus 200 disassociates the target function key to disable the target function key. Thereafter, when the user presses the target function key anew, the display apparatus 200 does not respond.

With reference to FIG. 13, a schematic diagram of a configuration page having a disable option according to some embodiments is shown. If the configuration page corresponds to the function key 2, the display apparatus 200 disables the function key 2 when the user selects the disable option on the configuration page.

In the above process of disabling the function key, the controller 250 of the display apparatus 200 may be configured to: determine a type of a target function option; and then control a target function key not to be associated with any content and application based on that the type of the target function option is a disable option, to disable a target key.

In some embodiments, a display apparatus 200 may further set an invalid setting page having a disable function for the function key separately. All editable function key options on the control device 100 may be displayed on the invalid setting page, and each function key option has a selection box which can be selected. When the selection box behind a function key option is checked, it is indicated that the user expects to disable the corresponding function key.

With reference to FIG. 14, a schematic diagram of an invalid setting page according to some embodiments is shown. Editable function keys 1, 2, 3 and 4 and selection boxes corresponding to the function keys are displayed on the invalid setting page. If the user expects to disable a function key 1, the user may position a focus to the selection box behind an option of the function key 1 by operating the direction keys on the control device 100, and then press the confirmation key on the control device 100 to check the selection box behind the option of the function key 1, thus the disabling of the function key 1 is completed.

The content of the above embodiments is the process of setting the function key in the display apparatus 200. The user may control the display apparatus 200 to execute a corresponding operation by pressing the target function key after the function key is set. The function keys set in the embodiments of the disclosure are editable function keys, while the direction keys, the confirmation key, the volume keys, the home key, the power key, the menu key, etc. on the control device 100 are non-editable function keys. Functions corresponding to the non-editable function keys may not be changed.

In some embodiments, a user may start to use a function corresponding to a function key after the user sets the function key. However, since the control device 100 further includes some non-editable function keys, the display apparatus 200 further needs to determine whether a key pressed by the user is an editable function key after receiving a key command from the user. If the key pressed by the user is a non-editable function key, the display apparatus 200 directly runs a fixed operation corresponding to the function key, such as increasing volume and switching to a menu page. If the key is an editable function key, a target function associated with the editable function key will be determined.

Moreover, it may be seen from the above content that the function associated with the function key may be a function corresponding to a specific operation content, a function corresponding to user customization, or a disabled function. Thus, the display apparatus 200 further needs to determine whether the function associated with the function key is disabled. If the function is disabled, no response will be made. If the function is not disabled, the display apparatus 200 may further determine whether the associated function has a specific operation content or corresponds to an application customized by the user.

Based on that the associated function is not disabled and corresponds to a specific operation content, the display apparatus 200 runs a specific operation content and displays a corresponding page. The display apparatus 200 directly launches an application and displays a page in the application under the condition that the associated function is not disabled and corresponds to the application.

Figure 15:
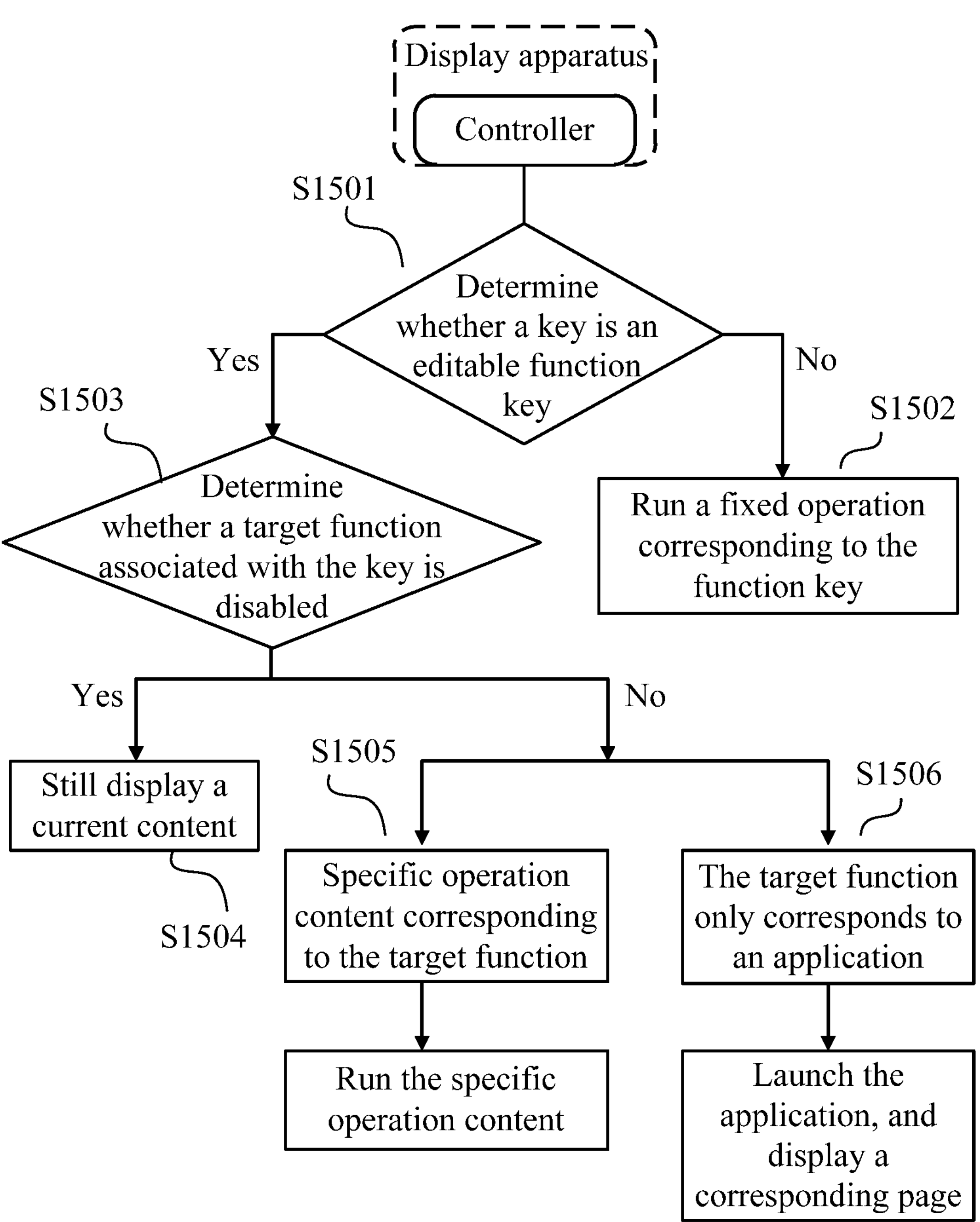
FIG. 15 is a flow chart showing that a display apparatus 200 responds to a key on a control device 100 according to some embodiments.

In the above response process in the display apparatus 200 according to a function key pressed by the user, as shown in FIG. 15, the controller 250 of the display apparatus 200 may be configured to:

- S1501, in response to a key command input from the user to the display apparatus 200 by pressing a key of the control device 100, determine whether the key is an editable function key;
- S1502, based on that the key is not an editable function key on the control device 100, run a fixed operation corresponding to the key;
- S1503, based on that the key is an editable function key, determine whether a target function associated with the key is disabled;
- S1504, based on that the target function is disabled, control the display 260 to display a current content being displayed on the display;
- S1505, based on that the target function is not disabled and corresponds to the specific operation content, control the display apparatus 200 to run a specific operation content and control the display 260 to display a corresponding page; and
- S1506, based on that the target function is not disabled and only corresponds to an application, control the display apparatus 200 to launch an application and control the display 260 to display a corresponding page.

It may be seen from the above that the display apparatus 200 in the embodiments of the disclosure may provide a key editing page for setting a function key on the control device 100 for the user. When the user needs to set a certain function key on the control device 100, the user may input a page display command to the display apparatus 200 to control the display apparatus 200 to display a key editing page. The display apparatus 200 may display the configuration page corresponding to a target key option after the user selects the target key option corresponding to the target function key on the key editing page. The user selects a target function option on the configuration page, and the display apparatus 200 associates the target function corresponding to the target function option with the target function key, thereby completing the setting of the function key. It can be seen that the display apparatus 200 enables limited function keys on the control device 100 to be adapted to more functions on the display apparatus 200 by setting the functions of the function keys.

Moreover, the user may control the display apparatus 200 to display a content corresponding to the target function or run an operation for realizing the target function by directly press the corresponding target function key on the control device 100 when the user wants to use the target function. Thus, the situation where the user needs to frequently operate the control device 100 to control the display apparatus 200 to realize a target function is avoided, and user experience is improved.

In order to solve the problem that keys on the control device 100 may not realize increasingly more functions in a display apparatus 200, the embodiments of the disclosure provides a method for setting a key on a control device 100. The method may be applied to the display apparatus 200 in the above embodiments. The method specifically includes: controlling a display 260 to display a key editing page in response to a page display command input from a user to a display apparatus 200; controlling the display 260 to display a configuration page corresponding to a target key option in response to a first selection command for selecting a target key option on the key editing page from a user; and associating a target function corresponding to a target function option with the target function key in response to a second selection command for selecting a target function option on the configuration page from a user, so as to complete setting of a function key on the control device 100.

In some embodiments, the method may further include: determining a type of the target function option; controlling the display 260 to display a custom page corresponding to a custom option under the condition that the type of the target function option is the custom option; and associating a target application corresponding to a target application option with the target function key in response to a third selection command for indicating selecting the target application option on the custom page from a user, to complete the setting of a function key on the control device 100.

In some embodiments, the method may further include: determining a type of the target function option; and associating a specific operation content corresponding to an operation option with the target function key under the condition that the type of the target function option is an operation option, to complete the setting of a function key on the control device 100.

In some embodiments, the method may further include: determining a type of the target function option; and controlling the target function key not to be associated with any content and application under the condition that the type of the target function option is a disable option to disable a target key.

In some embodiments, the method may further include: determining whether a key is an editable function key in response to a key command from the user to the display apparatus 200 by pressing the key on the control device 100; and determining a target function associated with the key under the condition that the key is an editable function key.

In some embodiments, the method may further include: controlling the display 260 to display a current content being played on the display under the condition that the target function is disabled.

In some embodiments, the method may further include: controlling the display apparatus 200 to perform a specific operation content and controlling the display 260 to display a corresponding page under the condition that the target function is not disabled and corresponds to the specific operation content.

In some embodiments, the method may further include: controlling the display apparatus 200 to launch an application and controlling the display 260 to display a corresponding page under the condition that the target function is not disabled and only corresponds to the application.

Since the method for setting a key on a control device in the embodiments of the disclosure may be applied to the display apparatus 200 as described in the above embodiments, other contents of the method for setting a key on a control device in the embodiments of the disclosure may refer to the contents of the above embodiments of the display apparatus 200, which will not be repeated herein.

Development of the display apparatus 200 and continuous research on the display apparatus have made voice function on the display apparatus 200 more and more popular. With a Google assistant on the overseas display apparatus 200 as an example, a user may perform voice interaction with the Google assistant on the display apparatus 200 via the control device 100 such as a remote controller, thereby bringing more convenience for user.

Voice interaction between the remote controller and the display apparatus 200 depends on a Bluetooth protocol, which requires that Bluetooth pairing between the remote controller and the display apparatus 200 before the remote controller may be used normally. When the display apparatus 200 or the remote controller is unpaired or connected abnormally, the remote controller may not realize Bluetooth communication with the display apparatus 200, directly resulting in failure of a Google voice function. The user may not use the voice function on the display apparatus 200, thereby greatly affecting use experience.

In view of the above issue, the embodiments of the disclosure provide a display apparatus 200. The display apparatus 200 and a control device 100 such as a remote controller may transmit a key command according to an infrared signal. Moreover, the control device 100 sends different key commands to the display apparatus 200 after a user presses different keys on the control device 100.

Since a voice service needs to be performed according to a Bluetooth communication protocol, the display apparatus 200 determines whether the Bluetooth pairing between the control device 100 and the display apparatus 200 is performed after receiving a voice key command sent from the control device 100. Only on the basis that the Bluetooth pairing is performed, the display apparatus 200 may respond to a voice key command input from the user according to the Bluetooth communication protocol and interact with the user according to the voice content input from the user in subsequent operations. The display apparatus 200 may provide a Bluetooth pairing prompt for the user if the Bluetooth pairing between the control device 100 and the display apparatus 200 is not performed, such that the user can complete the Bluetooth pairing between the control device 100 and the display apparatus 200. Moreover, the display apparatus 200 may continue to receive and respond to a voice key command after the Bluetooth pairing between the control device 100 and the display apparatus 200 is completed.

The control device 100 is usually provided with a voice key. The user may control the display apparatus 200 to display a voice service page by pressing the voice key once under the condition that the Bluetooth pairing between the control device 100 and the display apparatus 200 has completed. The control device 100 may receive the voice content input from the user when the user presses the voice key for a long time. The voice content is sent to the display apparatus 200 after the user releases the voice key on the remote controller, so as to control the display apparatus 200 to perform a corresponding operation.

Figure 16:
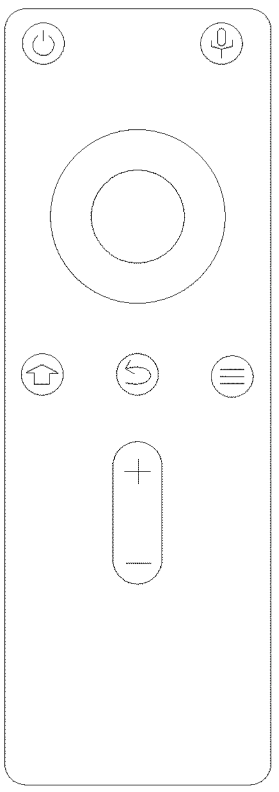
FIG. 16 is a schematic diagram of a control device 100 according to some embodiments.

With reference to FIG. 16, a schematic diagram of a control device 100 according to some embodiments is shown. The control device 100 is further provided with a voice key having a microphone identifier, in addition to direction keys, a confirmation key, a back key, a menu key, a home key, a power key, volume keys, etc.

Figure 17:
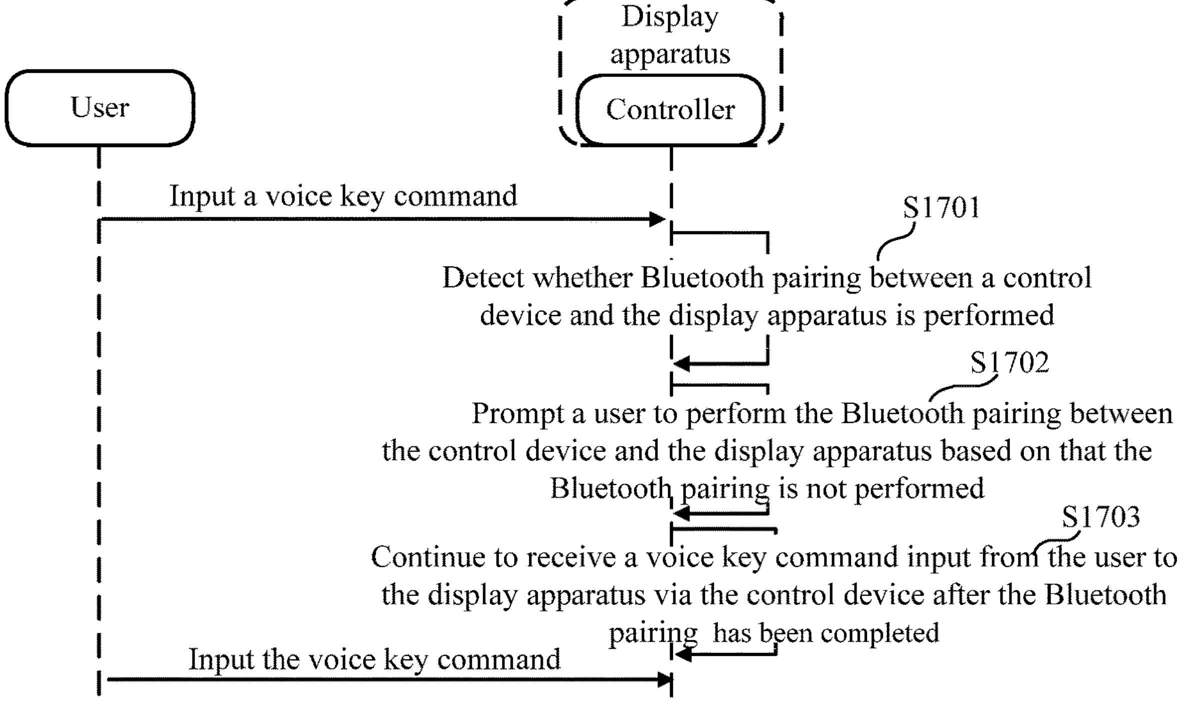
FIG. 17 is a schematic diagram of Bluetooth pairing between a display apparatus 200 and a control device 100 according to some embodiments.

With reference to FIG. 17, a schematic diagram of Bluetooth pairing between a display apparatus 200 and a control device 100 according to some embodiments is shown. In the above process of the Bluetooth pairing between the display apparatus 200 and the control device 100, a controller 250 of the display apparatus 200 may be configured to:

- S1701, upon receiving a voice key command from the control device 100 to the display apparatus 200 from a user, detect whether Bluetooth pairing between a control device 100 and a display apparatus 200 has been performed;
- S1702, based on that the Bluetooth pairing between the control device 100 and the display apparatus 200 is not performed, prompt the user to perform Bluetooth pairing between the control device 100 and the display apparatus 200; and
- S1703, based on that Bluetooth pairing between the control device 100 and the display apparatus 200 has been completed by the user, continue to receive a voice key command input from the user to the display apparatus 200 via the control device 100.

In some embodiments, in order to conveniently prompt the user to perform Bluetooth pairing between the control device 100 and the display apparatus 200, the display apparatus 200 may further display a pairing prompt page to the user if it is determined that the Bluetooth pairing between the display apparatus and the control device 100 is not performed, and may display different options on the pairing prompt page. Thus, the user selects whether the Bluetooth pairing between the control device 100 and the display apparatus 200 is performed.

Figure 18:
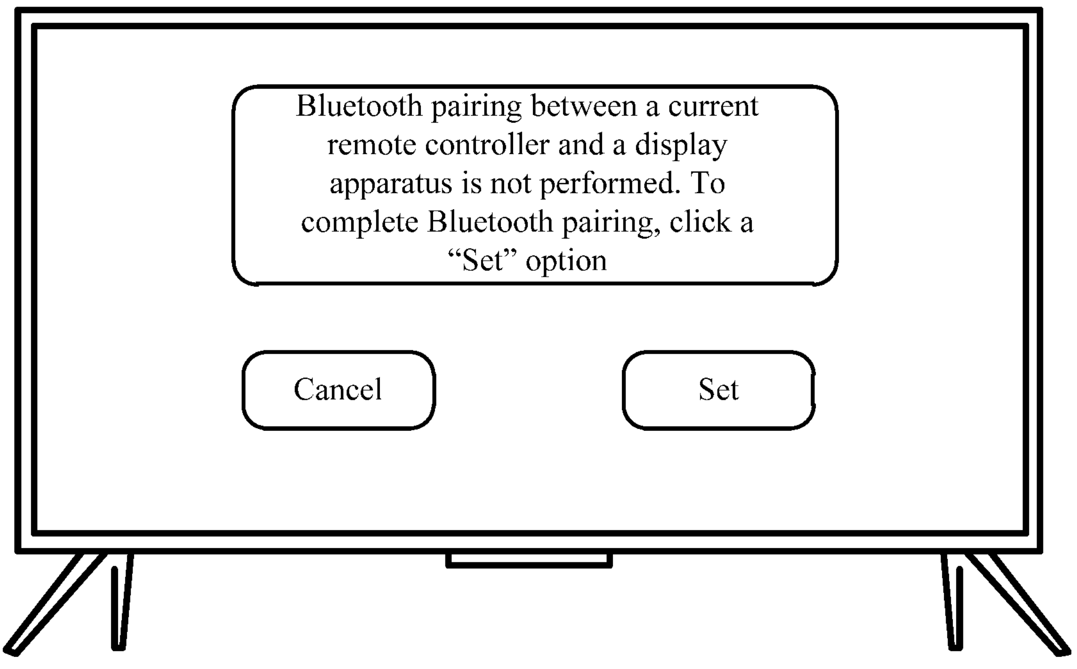
FIG. 18 is a schematic diagram of a pairing prompt page according to some embodiments.

With reference to FIG. 18, a schematic diagram of a pairing prompt page according to some embodiments is shown. The pairing prompt page displays a first cancel option configured for indicating cancelling pairing, and further displays a first setting option configured for indicating entering a setting page. If the user selects the first cancel option on the pairing prompt page, it is indicated that the user does not need or want to perform the Bluetooth pairing between the control device 100 and the display apparatus 200, the Bluetooth pairing between the display apparatus 200 and the control device 100 may not be performed in response to the first cancel command. If the user selects the first setting option on the pairing prompt page, it is indicated that the user wants to perform the Bluetooth pairing between the control device 100 and the display apparatus 200, the display apparatus 200 may further display the setting page in response to the first setting command, such that the user may further perform a pairing operation according to a content of the setting page.

The Bluetooth pairing between the display apparatus and the control device 100 is not performed under the condition that the display apparatus 200 receives the first cancel command, but the display apparatus 200 may further continue displaying a pairing failure prompt page under the condition that the first cancel command is received in order to avoid the situation that the user wants to perform the Bluetooth pairing anew and may not find the setting page. The pairing failure prompt page may display a second cancel option for indicating cancelling Bluetooth pairing and a second setting option for indicating entering the setting page.

Figure 19:
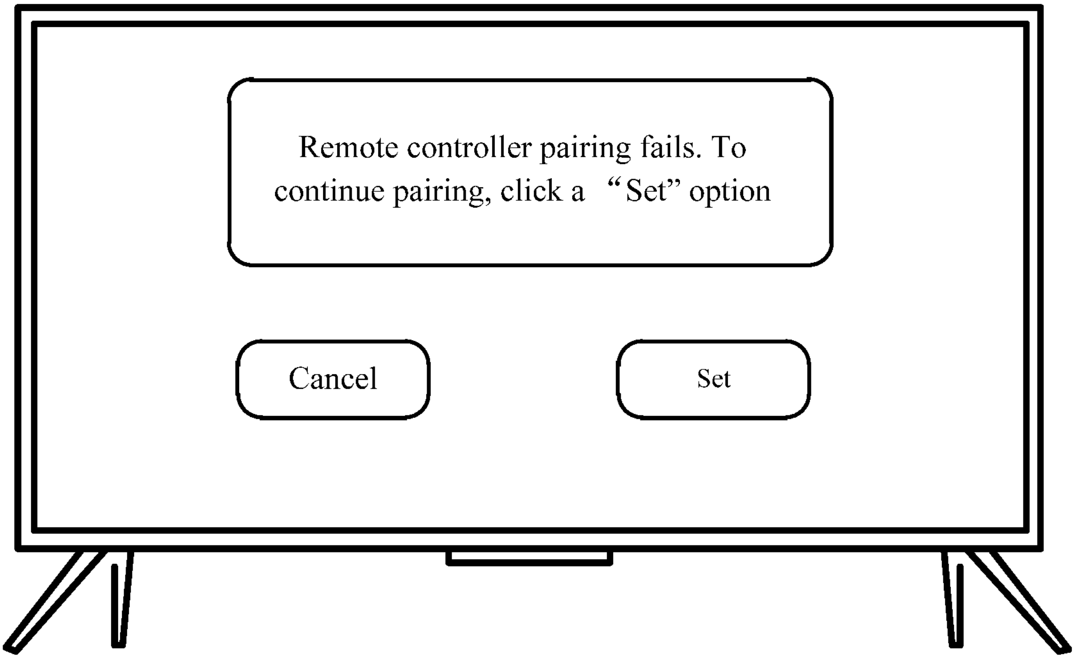
FIG. 19 is a schematic diagram of a pairing failure prompt page according to some embodiments.

With reference to FIG. 19, a schematic diagram of a pairing failure prompt page according to some embodiments is shown. If a user selects the second cancel command on the pairing failure prompt page, it is indicated that the user still does not need or want to perform Bluetooth pairing between the control device 100 and the display apparatus 200, the Bluetooth pairing between the display apparatus 200 and the control device 100 may not be performed in response to the second cancel command. If the user selects the second setting option on the pairing failure prompt page, it is indicated that the user wants to perform the Bluetooth pairing between the control device 100 and the display apparatus 200, the display apparatus 200 may further display the setting page in response to the second setting command, such that the user may perform further a pairing operation according to a content on the setting page.

Figures 20, 21:
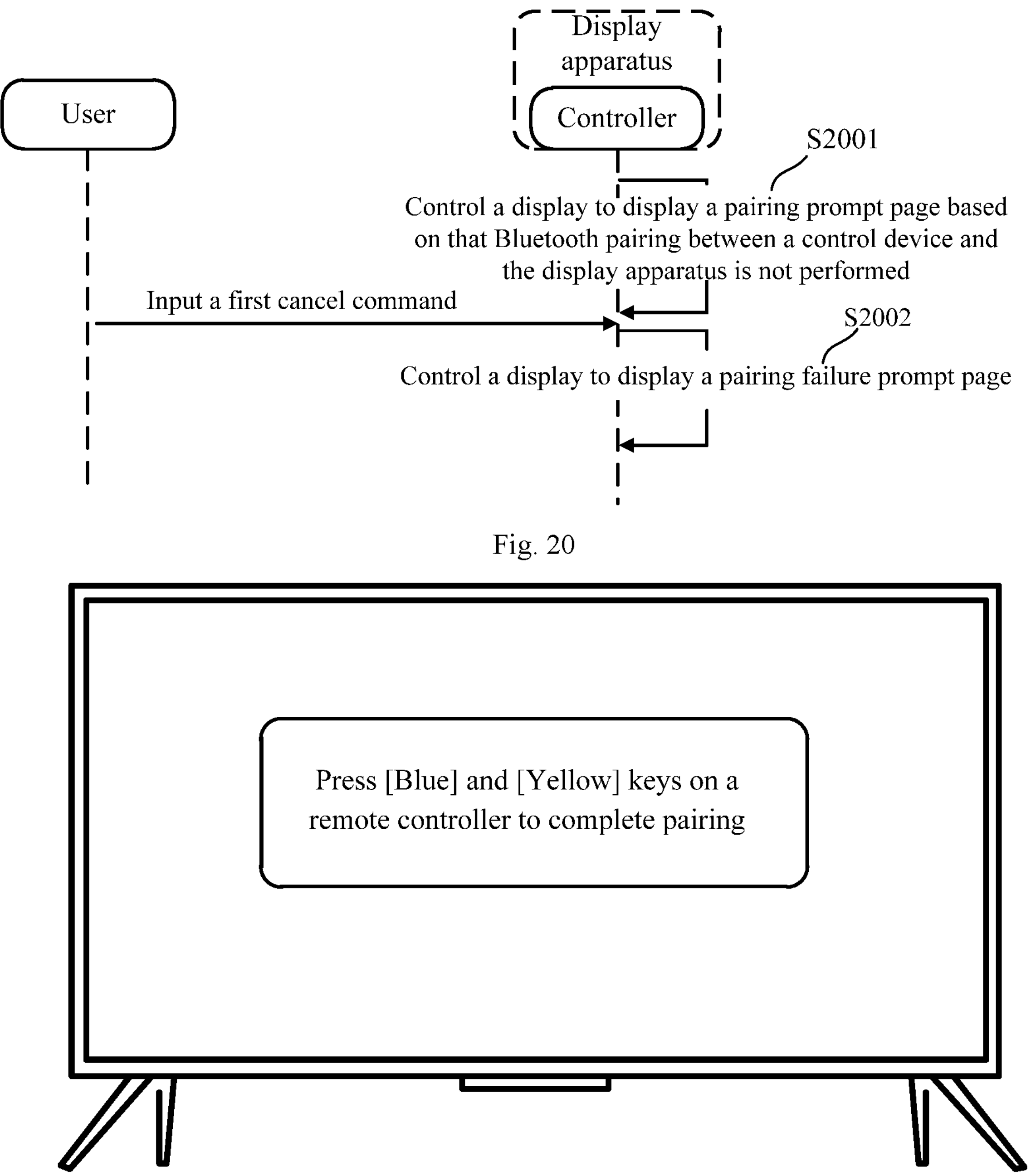
FIG. 20 is a schematic diagram showing that a display apparatus 200 displays a pairing failure prompt page according to some embodiments.
FIG. 21 is a schematic diagram of a setting page according to some embodiments.

With reference to FIG. 20, a schematic diagram showing that a display apparatus 200 displays a pairing failure prompt page according to some embodiments is shown. In the above process of displaying the pairing failure prompt page, the controller 250 of the display apparatus 200 may be further configured to:

- S2001, based on the Bluetooth pairing between the control device 100 and the display apparatus 200 is not performed, control the display 260 to display a pairing prompt page; and
- S2002, based on that a first cancel command for selecting a first cancel option on the pairing prompt page from the user is received, control the display 260 to display a pairing failure prompt page.

In some embodiments, if the user inputs no command to a display apparatus 200 within a preset time after the display apparatus 200 displays a pairing prompt page, the display apparatus 200 may also display a pairing failure prompt page to prompt the user to continue an operation of Bluetooth pairing. The preset time is a time configured by the display apparatus 200 itself, for example, 5 seconds, 3 seconds, etc.

In this case, the controller 250 of the display apparatus 200 may be configured to: control the display 260 to display a pairing failure prompt page based no command input on the pairing prompt page is received from a user within a preset time.

If the user needs to perform the Bluetooth pairing between the control device 100 and the display apparatus 200 after viewing the pairing prompt page, the user may select a first setting option on the pairing prompt page, and then input a first setting command to the display apparatus 200. Then, the display apparatus 200 displays a setting page in response to the first setting command. The setting page is usually configured to guide the user to press the target key on the control device to complete the operation of the Bluetooth pairing. For example, a volume "+" key and a back key are simultaneously pressed, and a blue key and a yellow key are simultaneously pressed.

With reference to FIG. 21, a schematic diagram of a setting page according to some embodiments is shown. A prompt message displayed on the setting page is "press [Blue] and [Yellow] keys on a remote controller to complete pairing". A user simultaneously presses the blue key and the yellow key on the remote controller, and further inputs a pairing command to the display apparatus 200. Then, the Bluetooth pairing between the display apparatus 200 and the control device 100 is performed in response to the pairing command.

Figure 22:
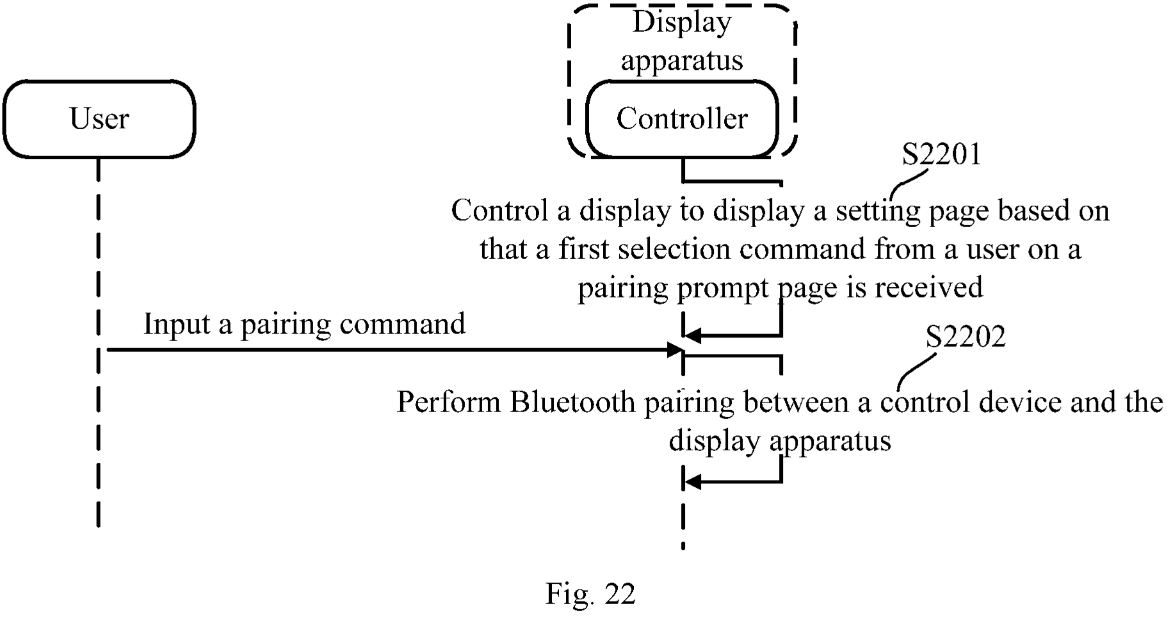
FIG. 22 is another schematic diagram of Bluetooth pairing between a display apparatus 200 and a control device 100 according to some embodiments.

With reference to FIG. 22, another schematic diagram of Bluetooth pairing between a display apparatus 200 and a control device 100 according to some embodiments is shown. In a process that Bluetooth pairing between the display apparatus 200 and the control device 100 is performed, the controller 250 of the display apparatus 200 is further configured to:

- S2201, based on that a first selection command for selecting a first setting option on a pairing prompt page from a user is received, control a display 260 to display a setting page; and
- S2202, in response to a pairing command input from the user by pressing a target key on the control device 100, perform Bluetooth pairing between the control device 100 and the display apparatus 200.

In some embodiments, if the display apparatus 200 detects that the Bluetooth pairing between the display apparatus 200 and the control device 100 has been performed after receiving a voice key command sent from the control device 100, the display apparatus 200 may directly display a voice service page in response to the voice key command, which indicates that the display apparatus 200 has entered a voice service state and may receive a voice content input from the user.

Figure 23:
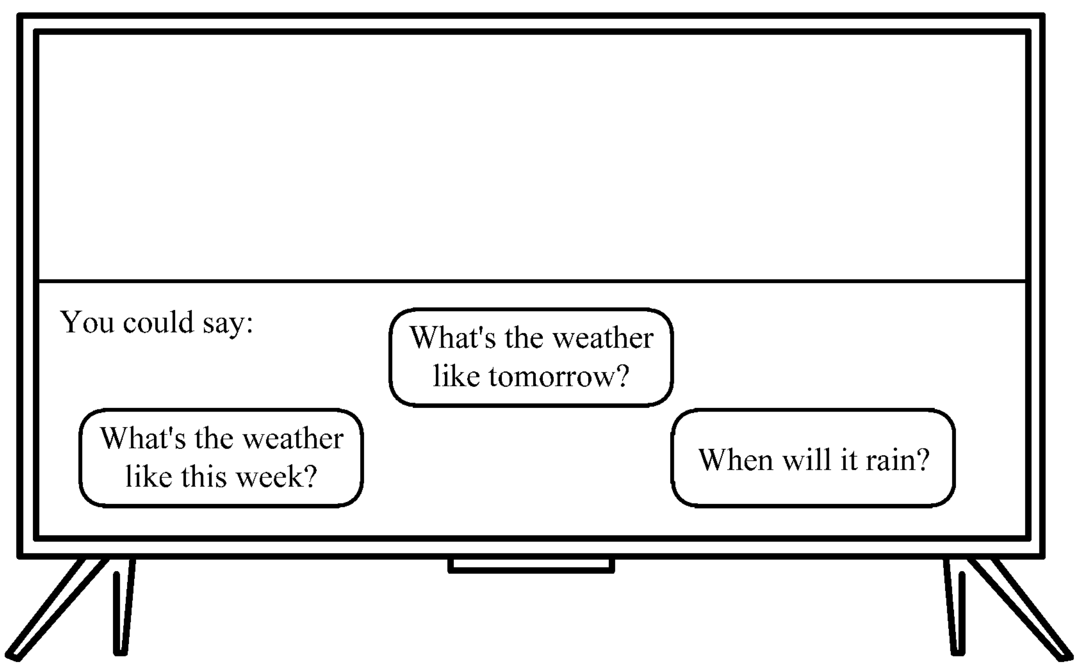
FIG. 23 is a schematic diagram of a voice service page according to some embodiments.

The voice service page usually displays a prompt message for providing a voice input content for the user. With reference to FIG. 23, a schematic diagram of a voice service page according to some embodiments is shown. The voice service page displays prompts of voice contents that may be inputted, such as "What's the weather like this week?", "What will the weather be like tomorrow?", and "When will it rain?". After a user inputs a specific voice content to the display apparatus 200, the display apparatus 200 recognizes the voice content through a voice service and runs a corresponding operation to display the corresponding content for the user.

For example, when the voice content input from the user to the display apparatus 200 is "What will the weather be like tomorrow?", the voice service of the display apparatus 200 may recognize the specific voice content, execute semantic analysis to obtain tomorrow's weather information from a server, and finally display the tomorrow's weather information to the user.

Figure 24:
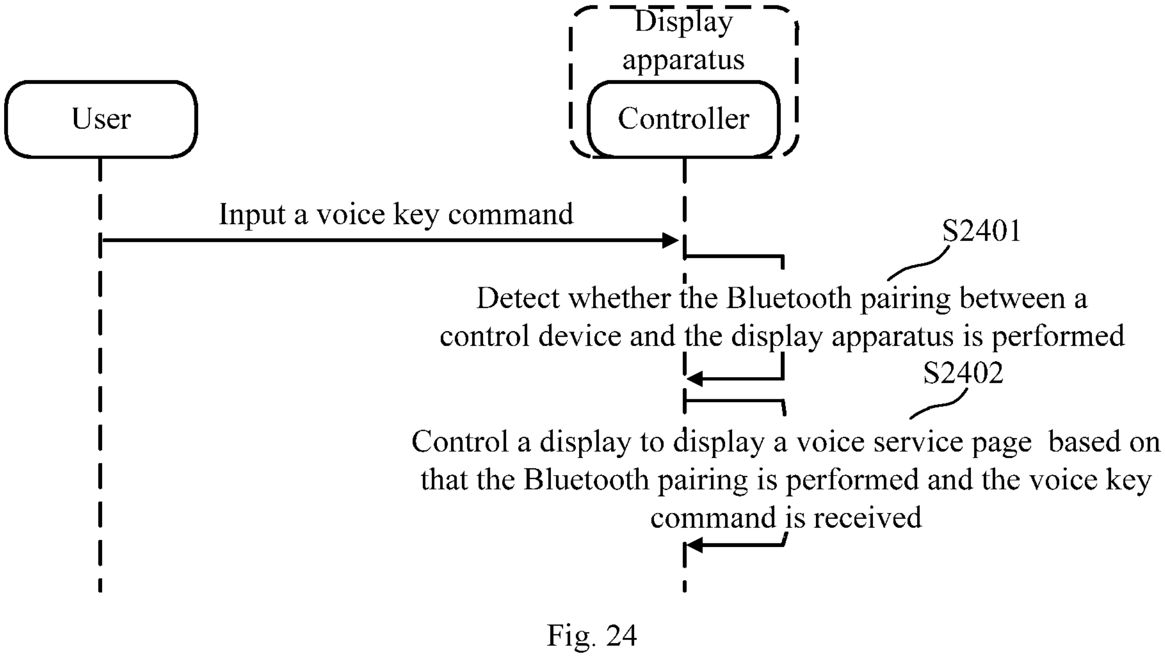
FIG. 24 is a schematic diagram showing that a display apparatus 200 responds to a voice key command according to some embodiments.

With reference to FIG. 24, a schematic diagram showing a display apparatus 200 responds to a voice key command according to some embodiments is shown. In the above process of responding to a voice key command, the controller 250 of the display apparatus 200 may be further configured to:

- S2401, based on that a voice key command input from a user to the display apparatus 200 via the control device 100 is received detect whether the Bluetooth pairing between the control device 100 and the display apparatus 200 is performed; and
- S2402, based on that the Bluetooth pairing between the control device 100 and the display apparatus 200 is performed and the voice key command is received, control a display 260 to display a voice service page.

In the above embodiments, if the user completes the Bluetooth pairing between the control device 100 and the display apparatus 200 through an operation of the Bluetooth pairing, the display apparatus 200 may continue to receive a voice key command sent from the control device 100, the display apparatus 200 may directly display the voice service page in response to subsequent voice key command(s) since the Bluetooth pairing between the control device 100 and the display apparatus 200 has been performed. In the process, the controller 250 of the display apparatus 200 may be configured to: continue to receive a voice key command input from the user to the display apparatus 200 via the control device 100 based on that the Bluetooth pairing between the control device 100 and the display apparatus 200 has been completed by the user; and then control the display 260 to display the voice service page in response to the voice key command.

In some embodiments, if the user still selects the second cancel option after the display apparatus 200 displays the pairing failure prompt page, the display apparatus 200 may close the pairing failure prompt page and still maintain a state that the display apparatus 200 is unpaired with the control device 100. Alternatively, if a user still inputs no command on a pairing failure prompt page within a preset time, a display apparatus 200 may also close the pairing failure prompt page and still maintain the state that the display apparatus 200 is unpaired with the control device 100. In the process, the controller 250 of the display apparatus 200 may be configured to: detect whether a second cancel command for selecting a second cancel option from the user is received based on that the display 260 displays the pairing failure prompt page; and control the display 260 to close the pairing failure prompt page under the condition that the second cancel command input from the user is received; and alternatively, control the display 260 to close the pairing failure prompt page under the condition that the display 260 displays the pairing failure prompt page and detects that no command input from the user on the pairing failure prompt page is received within a preset time.

In some embodiments, if the user needs to perform Bluetooth pairing between the display apparatus 200 and the control device 100 after the display apparatus 200 displays a pairing failure prompt page, a second setting option may be selected on the pairing failure prompt page to control the display apparatus 200 to display the setting page, such that the user completes an operation of the Bluetooth pairing according to a guidance content on the setting page. In the process, the controller 250 of the display apparatus 200 may be configured to: detect whether a second selection command for selecting the second setting option from the user is received under the condition that the display 260 displays the pairing failure prompt page; and control the display 260 to display the setting page based on that the second selection command input from the user is received.

It may be seen from the above content that the display apparatus 200 in the embodiments of the disclosure may receive a key command sent from the control device 100 such as a remote controller through an infrared signal. Moreover, when the key command is a voice key command, the display apparatus 200 needs to detect whether Bluetooth pairing between the display apparatus and the control device 100 is performed after receiving the voice key command. If the Bluetooth pairing is not performed, the display apparatus 200 may prompt the user to perform the Bluetooth pairing between the control device 100 and the display apparatus 200. The problem that the display apparatus 200 cannot provide a voice service to the user due to failure in the Bluetooth pairing between the display apparatus and the control device 100 is solved.

After the Bluetooth pairing is completed, the display apparatus 200 may continue to receive the voice key command sent from the control device 100, and may display a corresponding content or execute a corresponding operation in response to the voice key command. Thus, a voice interaction experience between the user and the display apparatus 200 is ensured.

In order to solve the problem that the user may not use the voice function on the display apparatus 200 due to the display apparatus 200 not being paired with the control device 100, the embodiments of the disclosure further provides a method for pairing a control device and a display apparatus. The method may be applied to the display apparatus 200 in the above embodiments. The method may include: detecting whether Bluetooth pairing between a control device 100 and a display apparatus 200 is performed under the condition that a voice key command input from a user to the display apparatus 200 via the control device 100 is received; prompting the user to perform the Bluetooth pairing between the control device 100 and the display apparatus 200 under the condition that the Bluetooth pairing between the control device 100 and the display apparatus 200 is not performed; and continuing to receive the voice key command input from the user to the display apparatus 200 via the control device 100 under the condition that the Bluetooth pairing between the control device 100 and the display apparatus 200 has been completed by the user.

In some embodiments, the method further includes: controlling the display 260 to display a pairing prompt page under the condition that the Bluetooth pairing between the control device 100 and the display apparatus 200 is not performed. The pairing prompt page is configured to display a first cancel option and a first setting option for directly entering a setting page.

In some embodiments, the method further includes: controlling the display 260 to display a setting page based on that a first selection command for selecting a first setting option on the pairing prompt page from a user is received; and performing the Bluetooth pairing between the control device 100 and the display apparatus 200 in response to a pairing command input from the user by pressing a target key on the control device 100. The setting page is configured to guide the user to press a target key on the control device 100, so as to complete an operation of the Bluetooth pairing.

In some embodiments, the method further includes: controlling the display 260 to display a pairing failure prompt page under the condition that a first cancel command for selecting a first cancel option on the pairing prompt page from a user is received. The pairing failure prompt page is configured to display a second cancel option and a second setting option for entering the setting page.

In some embodiments, the method further includes: controlling the display 260 to display a pairing failure prompt page based on that no command on the prompt page from the user is received within a preset time.

In some embodiments, the method further includes: based on that the Bluetooth pairing between the control device 100 and the display apparatus 200 has been performed, in response to the voice key command, controlling the display 260 to display a voice service page. The voice service page is configured to display a prompt message to the user for inputting a voice content.

In some embodiments, the method further includes: continuing to receive a voice key command input from the user to the display apparatus 200 via the control device 100 based on that the Bluetooth pairing between the control device 100 and the display apparatus 200 has been completed by the user; and controlling the display 260 to display a voice service page in response to the voice key command received.

In some embodiments, the method further includes: based on that the display 260 displays the pairing failure prompt page, detecting whether a second cancel command for selecting the second cancel option from the user is received; and controlling the display 260 to close the pairing failure prompt page based on that the second cancel command input from the user is received.

In some embodiments, the method further includes: based on that the display 260 displays the pairing failure prompt page, detecting whether a second selection command for selecting the second setting option from the user is received; and controlling the display 260 to display the setting page based on that the second selection command input from the user is received.

For the convenience of explanation, the above description has been made in combination with the specific embodiments. However, the above exemplary discussion is not intended to be exhaustive or to limit the embodiments to the specific forms disclosed above. According to the above teachings, various modifications and deformations can be obtained. The selection and description of the above embodiments are to better explain the principles and practical applications, such that those skilled in the art better use the embodiments and various variant embodiments suitable for specific use considerations.

What is claimed is:

1. A display apparatus, comprising:

a display configured to display an image from broadcast system or network and/or a user interface;

a user input interface configured to receive a command according to an infrared protocol or a Bluetooth protocol; and at least one processor in connection with the display and the user input interface and configured to execute instructions to cause the display apparatus to:

upon receiving a first voice key command from a control device, detect whether Bluetooth pairing between the control device and the display apparatus is performed, wherein the first voice key command is a command generated by pressing of a voice key on the control device;

based on that the Bluetooth pairing between the control device and the display apparatus is not performed, communicate with the control device using an infrared protocol and display a prompt message on the display to prompt a user to press the control device to input a key command corresponding to the prompt message and to perform the Bluetooth pairing between the control device and the display apparatus, wherein the display apparatus is configured to receive an infrared signal according to the key command from the control device;

based on that the Bluetooth pairing between the control device and the display apparatus has been completed according to the prompt message, receive a second voice key command from the control device by pressing the voice key; and in response to the second voice key command, display a voice service page on the display, wherein the voice service page displays a message indicating a voice input content, wherein the at least one processor is further configured to execute the instructions to cause the display apparatus to:

display a pairing prompt page comprising a first cancel option for cancelling Bluetooth pairing between the control device and the display apparatus and a first setting option for entering a setting page, and based on that no command input from the user, by pressing the control device to input a key command corresponding to the prompt page, is received within a preset time, display a pairing failure prompt page comprising a second cancel option and a second setting option for entering the setting page, wherein the setting page is configured to guide the user to press a target key on the control device for completing an operation of the Bluetooth pairing.

2. The display apparatus according to claim 1, wherein the at least one processor is further configured to execute the instructions to cause the display apparatus to:

in response to a selection of the first setting option on the pairing prompt page, display the setting page comprising guidance for pressing a target key on the control device to complete the Bluetooth pairing; and in response to a pairing command from a user pressing the target key on the control device, complete the Bluetooth pairing between the control device and the display apparatus.

3. The display apparatus according to claim 1, wherein the at least one processor is further configured to execute the instructions to cause the display apparatus to:

in response to a first cancel command for selecting the first cancel option on the pairing prompt page, display a pairing failure prompt page comprising a second cancel option and a second setting option for entering the setting page.

4. The display apparatus according to claim 1, wherein the at least one processor is further configured to execute the instructions to cause the display apparatus to:

while the display displays the pairing failure prompt page, detect whether a second cancel command for selecting the second cancel option is received; and in response to receiving the second cancel command, control the display to close the pairing failure prompt page.

5. The display apparatus according to claim 1, wherein the at least one processor is further configured to execute the instructions to cause the display apparatus to:

in response to a third voice key command for displaying a key editing page, display the key editing page comprising multiple key options corresponding to multiple editable function keys on the control device.

6. The display apparatus according to claim 5, wherein the at least one processor is further configured to execute the instructions to cause the display apparatus to:

in response to a first selection command for selecting a target key option on the key editing page, display a configuration page corresponding to the target key option, wherein the configuration page is configured to display a function option that is associated with a target function key on the control device.

7. The display apparatus according to claim 6, wherein the at least one processor is further configured to execute the instructions to cause the display apparatus to:

in response to a second selection command for selecting a target function option on the configuration page, associate a target function corresponding to the target function option with the target function key.

8. The display apparatus according to claim 7, wherein the at least one processor is further configured to execute the instructions to cause the display apparatus to:

determine a type of the target function option;

based on that the type of the target function option is a custom option, control the display to display a custom page corresponding to the custom option comprising an application option that is associated with the target function key; and in response to a third selection command for selecting a target application option on the custom page, associate a target application corresponding to the target application option with the target function.

9. The display apparatus according to claim 7, wherein the at least one processor is further configured to execute the instructions to cause the display apparatus to:

determine a type of the target function option; and based on that the target function option is an operation option, associate a specific operation corresponding to the target function option with the target function key.

10. The display apparatus according to claim 7, wherein the at least one processor is further configured to execute the instructions to cause the display apparatus to:

determine a type of the target function option; and based on that the type of the target function is a disable option, control the target function key not to be associated with an operation or application, to disable the target function key.

11. A method for a display apparatus, comprising:

upon receiving a first voice key command from a control device, detecting whether Bluetooth pairing between the control device and the display apparatus is performed, wherein the first voice key command is a command generated by pressing of a voice key on the control device;

based on that the Bluetooth pairing between the control device and the display apparatus is not performed, communicating with the control device using an infrared protocol and displaying a prompt message on the display to prompt a user to press the control device to input a key command corresponding to the prompt message and to perform the Bluetooth pairing between the control device and the display apparatus, wherein the display apparatus is configured to receive an infrared signal according to the key command from the control device;

based on that the Bluetooth pairing between the control device and the display apparatus has been completed according to the prompt message, receiving a second voice key command from the control device by pressing the voice key; and in response to the second voice key command, displaying a voice service page on the display, wherein the voice service page displays a message indicating a voice input content, wherein the method further comprising:

displaying a pairing prompt page comprising a first cancel option for cancelling Bluetooth pairing between the control device and the display apparatus and a first setting option for entering a setting page, and based on that no command input from the user, by pressing the control device to input a key command corresponding to the prompt page, is received within a preset time, displaying a pairing failure prompt page comprising a second cancel option and a second setting option for entering the setting page, wherein the setting page is configured to guide the user to press a target key on the control device for completing an operation of the Bluetooth pairing.

12. The method according to claim 11, further comprising:

in response to a selection of the first setting option on the pairing prompt page, displaying the setting page comprising guidance for pressing a target key on the control device to complete the Bluetooth pairing; and in response to a pairing command from a user pressing the target key on the control device, completing the Bluetooth pairing between the control device and the display apparatus.

13. The method according to claim 11, further comprising:

in response to a first cancel command for selecting the first cancel option on the pairing prompt page, displaying a pairing failure prompt page comprising a second cancel option and a second setting option for entering the setting page.

14. The method according to claim 11, further comprising:

while the display displays the pairing failure prompt page, detecting whether a second cancel command for selecting the second cancel option is received; and in response to receiving the second cancel command, controlling the display to close the pairing failure prompt page.

15. The method according to claim 11, wherein the method further comprises:

in response to a third voice key command for displaying a key editing page, displaying the key editing page comprising multiple key options corresponding to multiple editable function keys on the control device.

16. The method according to claim 15, wherein the method further comprises:

in response to a first selection command for selecting a target key option on the key editing page, displaying a configuration page corresponding to the target key option, wherein the configuration page is configured to display a function option that is associated with a target function key on the control device.

17. The method according to claim 16, further comprising:

in response to a second selection command for selecting a target function option on the configuration page, associating a target function corresponding to the target function option with the target function key.

18. The method according to claim 17, further comprising:

determining a type of the target function option;

based on that the type of the target function option is a custom option, controlling the display to display a custom page corresponding to the custom option comprising an application option that is associated with the target function key; and in response to a third selection command for selecting a target application option on the custom page, associating a target application corresponding to the target application option with the target function.

19. The method according to claim 17, further comprising:

determining a type of the target function option; and based on that the target function option is an operation option, associating a specific operation corresponding to the target function option with the target function key.

20. The method according to claim 17, further comprising:

determining a type of the target function option; and based on that the type of the target function is a disable option, controlling the target function key not to be associated with an operation or application, to disable the target function key.

* * * * *